May 19, 1964

E. C. THOMSON 3,133,606

SCALES

Filed June 28, 1961

Inventor
Elihu C. Thomson,
by Maxwell Fish
Atty.

United States Patent Office 3,133,606
Patented May 19, 1964

3,133,606
SCALES
Elihu C. Thomson, Wellesley, Mass., assignor to Farrington Machines, Inc., Cambridge, Mass., a corporation of Massachusetts
Filed June 28, 1961, Ser. No. 120,257
6 Claims. (Cl. 177—210)

The invention relates to an improved electromagnetic balance or scale adapted for weighing successive items or increments of material in very rapid succession.

The illustrated scale is an improvement upon the scale set forth in my copending application Serial No. 809,115, now Patent No. 3,078,936, of which the present invention is a continuation in part. The scale is of the general type which comprises a mechanically constructed and operating balance system including a balance supporting weight to be measured, and a counterweight and electrical devices which include means to detect the fact that an unbalance of the scale has occurred, electrical means for producing a measurable balancing force to restore the balance, and means for measuring the force and thereby the weight to be measured.

It is a principal object of the invention to provide a novel and more efficient construction and arrangement of the electric operating and control devices for the scale.

It is a further object of the invention to provide in the electrical operating and control mechanism referred to an electrical switch device which will operate automatically and without the intervention of any moving parts to supply and to shut off an electrical current of substantially fixed value supplied to an electrical balance compensating device in accordance with the dictation of a differential capacitor shiftable with the weighing pan of the scale.

The several features of the invention will be readily understood by one skilled in the art from the following description taken in connection with the accompanying drawings in which.

Figure 1:
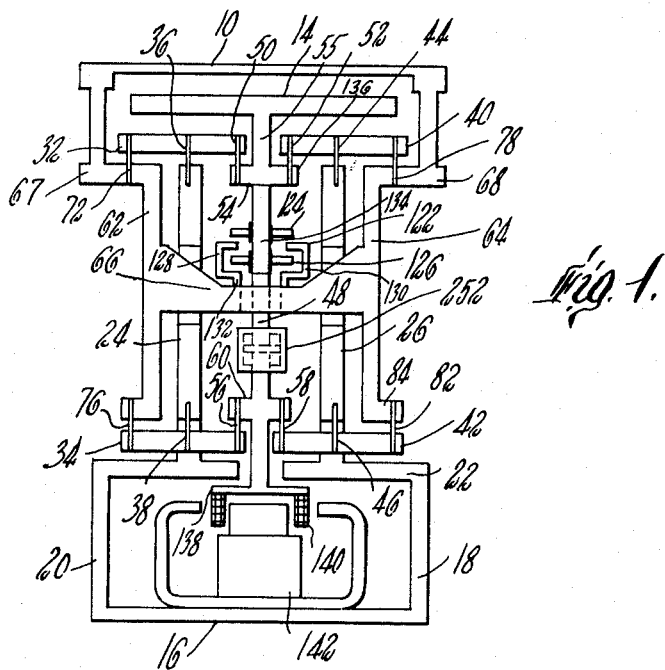
FIG. 1 is a vertical section showing in diagrammatic form FIG. 3 of 809,115 a double balance system scale employed in carrying out the present invention.

The scale illustrated in the drawings as embodying in a preferred form the several features of the invention comprises a double balance two bar scale having a pan supporting plate 10 on which is carried a weight receiving pan indicated at 12 and a counterweight 14 which is located directly beneath the pan supporting plate 10 so that the center of gravity of the counterweight 14 and associated parts substantially coincides with the center of the weight to be measured and associated parts including the pan 12, the material loaded on the pan, the pan supporting plate 10 and the supporting structure on which the plate 10 is carried.

The scale assembly comprises a box frame having a base plate 16, two vertically disposed side plates 18 and 20 and an intermediate floor plate 22.

The balance mechanism is mounted from the floor plate 22 on an inner frame comprising two uprights 24, 26 which are secured to the floor plate 22.

The balancing mechanism of the scale as best shown in FIG. 1 comprises two double beam balances, one balance comprising two parallel beams 32, 34 which are mounted from the upright 24 on frictionless spring pivots 36, 38, and the other balance comprising two parallel beams 40, 42 mounted on frictionless spring pivots 44, 46 on the upright 26. The two double beam balances above described are located at opposite sides of an imaginary vertical line which represents the vertical axis of the coinciding centers of gravity of the weight and counterweight.

The beams at their inner or adjacent ends are all connected with a centrally located cylindrical counterweight post assembly generally indicated at 48. The upper beams 32, 40 of the respective balances are connected by fricitonless spring pivots 50, 52 with a cylindrical cap 54 which forms part of the cylindrical counterweight post assembly 48. The counterweight 14 is supported above the cap 54 on a rod 55 threaded at one end into the cap 54 and at its upper end into the counterweight 14. The lower beams 34 and 42 of the two balances are connected respectively by means of frictionless spring pivots 56 and 58 with a collar 60 forming part of the cylindrical counterweight post assembly 48.

The beams 32, 34, 40 and 42 forming the two double beam balances are connected at their outer ends respectively to two vertically disposed side plates 62, 64 which form part of a rigidly constructed vertically movable frame forming part of the weight assembly of the scale. The frame referred to comprises with the side plates 62, 64 a crossbeam 66 which is set vertically on edge and is connected at the two ends to the respective side plates. At their upper ends the side plates 62, 64 have secured thereto horizontally disposed straps 67, 68 which form part of a platform for the pan supporting plate 10. The outer ends of the respective balance beams are connected respectively by means of frictionless spring pivots 72 and 78 with brackets secured to the frame side plates 62, 64. Beam 34 is connected with the lower end of side plate 62 by means of a spring pivot 76. Beam 42 is connected by a spring pivot 82 with a bracket 84 secured to the lower end of the side plate 64.

In the illustrated form of the invention, electrical devices are provided for controlling the operation of the scale and for measuring deviations from a predetermined unit weight of each of a series of increments of material placed successively upon the weighing pan of the scale. The control system employed involves the application of a counterforce of fixed amount and repetitively applied, the time average of which is at all times equal to the force due to the excess weight of the unknown weight over that of the counterweight, thereby preventing the beam balance system from deflecting to an unbalance position. The weight is measured with reference to said time average of said repetitively applied force. This force is preferably generated by the reaction of the magnetic field generated by a current carrying coil with respect to a permanent magnetic field. It is assumed that the permanent field is constant and that the electrical devices are constant and arranged to deliver a current thereto which is maintained always at the same voltage.

The control system herein described is particularly adapted for making of instantaneous weight measurements in rapid succession under conditions in which the weight and counterweight masses are maintained at all times substantially in a predetermined scale balance position. In accordance with the system here shown, at the instant the smallest measurable displacement due to weight placed on the scale is detected, the current in the coil is caused to rise discontinuously to a value more than sufficient to restore the displacement to zero with the heaviest anticipated weight. When the displacement is no longer detected, the coil current is caused to fall discontinuously to zero and the beam again starts to displace.

The current occurs in pulses but the time average of the force pulses generated by the intermittent current pulses is just enough to offset the weight added to the scale. Since the beam oscillations are small, the pulses occur at a high repetition rate. In the illustrated construction the weight is measured by causing this current to generate a voltage drop in a resistance, and a steady indication is obtained by electrical filtering. Because of the high pulse rate, a smooth average value is obtained quickly, and the weight measurement is practically instantaneous.

Essential elements of the control system for the scale above outlined includes the displacement detector device and a current-to-force transducer, which may take the form of a current carrying coil movable in a magnetic field, and which is responsive to the detector. In a preferred form of the control system illustrated in FIGS. 2 and 3, the principal element comprises a differential capacitor having stationary plates and a plate attached to the balance for movement therewith, a high frequency oscillator, a phase comparator which includes a rectifier and means for producing a filtered D.C. output, and a bistable D.C. amplifier having as an element thereof a transistor switching circuit whereby an unbalance signal from the differential capacitor has the effect of supplying current from a constant voltage source to said magnet of varying duration and period in accordance with the duration and period of the unbalance signals.

Figure 2:
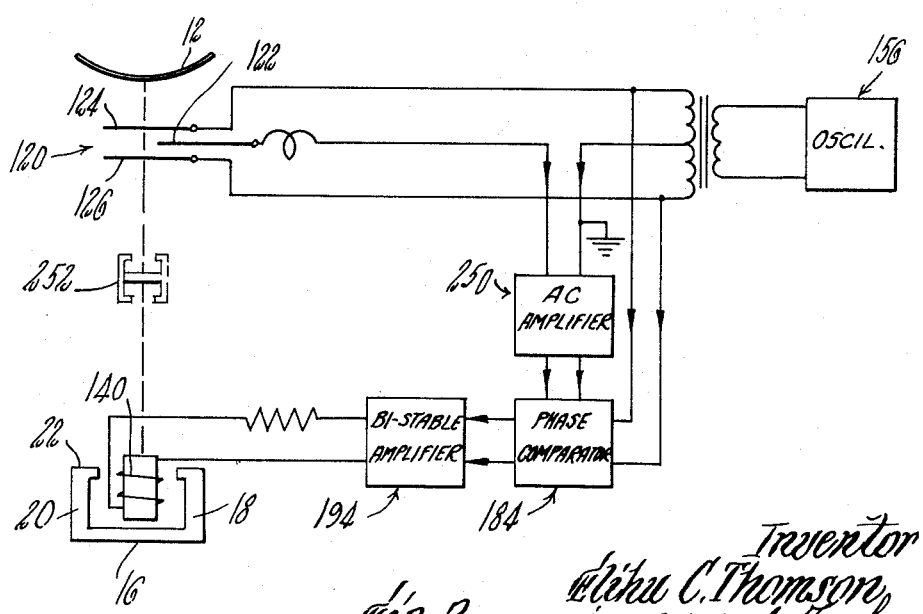
FIG. 2 is an electrical diagram illustrating particularly the pulse-time averaging method of operation of the high speed scale illustrated in FIGS. 1 and 3.
Figure 3:
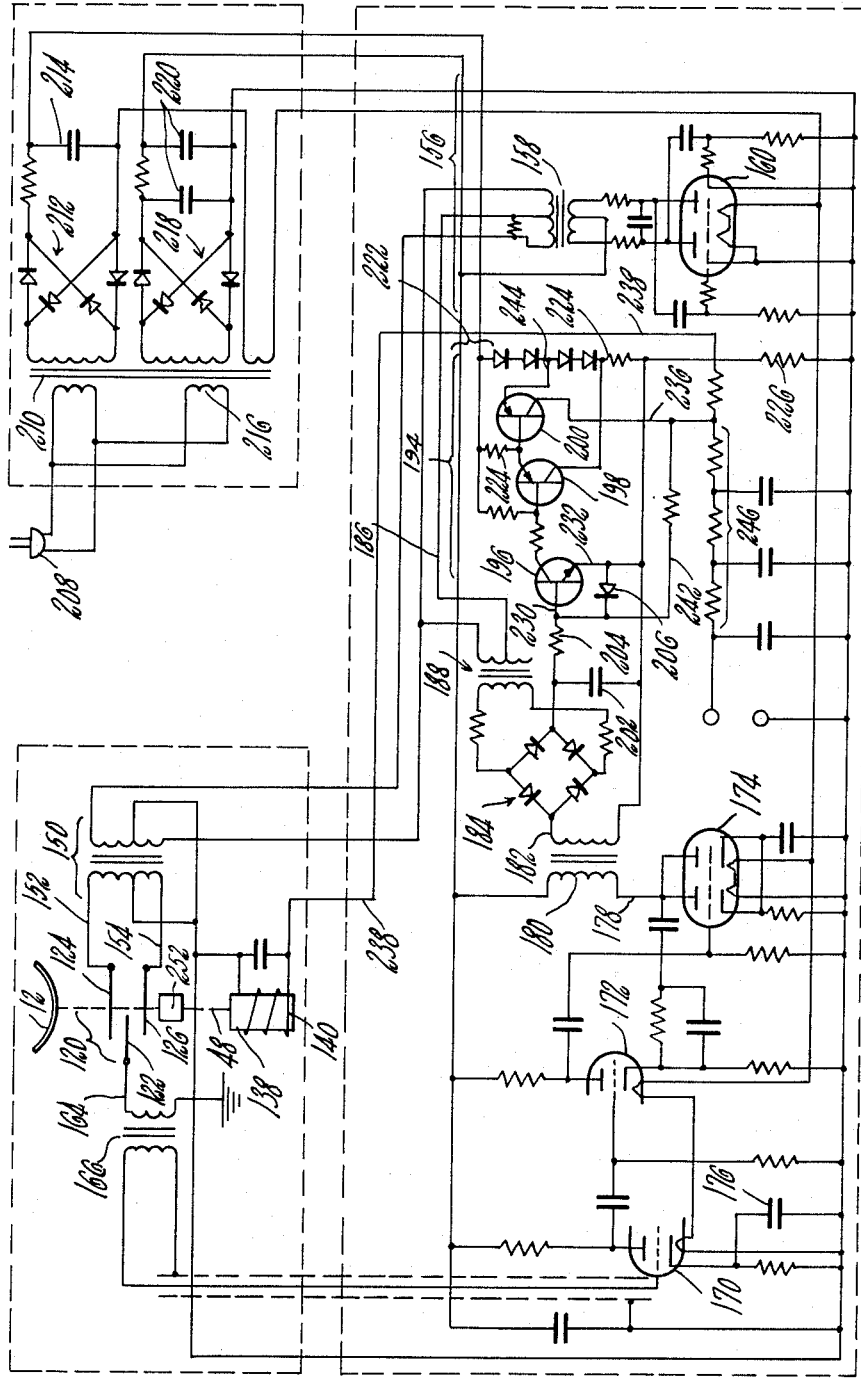
FIG. 3 is a high speed scale circuit schematic diagram illustrating a preferred form of the invention.

One form of the electrical control and measuring system employed as shown in FIGS. 1, 2, and 3 of the drawings includes a balance displacement detector device comprising a differential capacitor 120 having a central plate 122 connected to move with the weight assembly including tie member 66, and two plates 124 and 126 disposed at opposite sides of the plate 122 in spaced relation thereto and connected to move with the counterweight assembly on post 48. As shown in FIG. 1, the central plate 122 is mounted on two upright members 128, 130 on a transverse plate 132 which is in turn secured to the tie member 66. The two spaced apart plates 124 and 126 are mounted on a central spindle 134 which passes through a central aperture in the plate 122 and is secured at its upper end to a transverse plate 136 mounted in the upper end of the cylindrical post 48 forming part of the counterweight assembly.

A current-to-force transducer is provided which comprises a coil movable in a magnetic field provided by a stationary magnet. A cylinder 138 secured to the lower end of the cylindrical post 48 of the counterweight assembly has wound thereon coils 140. The cylinder and coils 140 are arranged in the field of a permanent magnet 142 secured to the frame of the scale.

Referring more specifically to the electrical diagram of FIG. 3, a transformer 150 supplies the two capacitor plates 124, 126 with equal alternating voltages with respect to ground, but opposite in phase, through connecting wires 152, 154 respectively. The plates 124, 126 are spaced from one another on the vertically movable counterweight post assembly 48.

A primary winding in the transformer 150 is connected through wires with an oscillator generally designated at 156 which comprises a transformer 158 and a conventional astable multi-vibrator 160. The plate 122 of the differential capacitor which is interposed between said plates 124, 126 is connected by means of a wire 164 with the primary of a transformer 166 which steps down the voltage and steps up the current and thereby decreases the apparent source impedance. This reduces the effect of capacitance in the interconnecting cable which would tend to shift the phase, and makes the line carrying the signal less susceptible to direct pick up from the oscillator 156.

Any unbalance signal produced by the relative movement of the plates 124, 126 with respect to plate 122 is amplified in the conventional manner in two capacitance-coupled stages consisting of amplifier tubes 170 and 172 connected in cascade. The third stage of amplification is added in the form of a power amplifier 174 utilizing two tube sections in parallel. A portion of the signal from the plates of the power amplifier unit 174 is fed back degeneratively to the cathode of the preceding stage to provide gain stabilization. A capacitor 176 in this network increases the feedback so as to reduce gain at frequencies higher than the signal frequency.

The power amplifier stage 174 is connected through a wire 178 with the primary of a transformer 180, the secondary winding of which is connected through a wire 182 with a conventional diode bridge phase comparator 184. The bridge 184 is fed a reference phase from the oscillator 156 through a wire 186 and a voltage-changing transformer 188. During half of a cycle the reference phase is of such polarity that the diodes of the bridge 184 are so biased as to be conductive and will pass current whose direction is dependent on the polarity of the signal from 182 during that time period. During the other half-cycle the diodes are inversely biased by the reference phase so that they are nonconductive for any signal input during this half-cycle.

The rectified and filtered signal from the phase comparator 184 is now passed into a bistable D.C. amplifier generally designated at 194 and comprising an input transistor 196, an amplifier transistor 198 and a power transformer transistor 200.

The half-wave D.C. output of the phase comparator 184 charges capacitor 202 to nearly the peak value of the half-wave pulses of signal voltage. The time constant of this capacitor 202 with resistor 204 is long compared to a half-cycle, but because the frequency is high (5,000 c.p.s.), is still short enough to be negligible compared to the response time of the scale. Voltage across the capacitor 202 causes a current flow in the base-emitter circuit of the input transistor 196 for one polarity of the signal, or if the polarity is opposite, through a shunt diode 206.

The transistor circuit is powered by a separate 35 volt supply which is constructed and arranged to provide a substantially fixed voltage source. The D.C. is obtained from a main power line 208 and a transformer 210 through a diode bridge 212 and is filtered by a single 500 mfd. capacitor 214. A second 175 volt D.C. power supply is provided by means of a transformer 216 and a diode bridge 218 filtered by two capacitors 220 in parallel relation. The two power supplies have a common ground.

The transistors 196, 198, and 200 of the bistable D.C. amplifier are supplied from a voltage divider 222 containing four silicon diodes and two resistors 224, 226. The silicon diodes are operated in their conducting direction and produce a voltage drop that increases only slightly with increasing current. The bias voltages to the transistors are thus maintained at substantially fixed values. Normally all the transistors are cut off because no base current is flowing in any of them and they are voltage-biased to cut off.

When a positive voltage appears across the capacitor 202 from the phase comparator 184 the input transistor 196 receives base current through the base connection 230 and emitter connection 232 which causes collector current to flow. This current flows through a collector-to-base connection with the amplifier transistor 198 which in turn causes base current to flow in the power transformer transistor 200 through an emitter-to-base lead.

The resulting collector current in the power transformer transistor 200 flows through the scale coil 140 to ground through the lead 238. The collector current causes the collector voltage of this transistor 200 to go positive. When it is more positive than the emitter of the input transistor 196, it adds to the current from the phase detector (through feedback path 242). This causes a rapid buildup of current which drives the power transformer transistor to saturation. The action of the circuit is therefore similar to a switch. The switching action takes place instantaneously as soon as current from the phase comparator is sufficient to overcome the cutoff bias in the input transistor 196. The power transformer transistor 200 will remain saturated until the phase comparator voltage becomes sufficiently negative so that it cancels the current to the input transistor 196 supplied by the feedback path 242 from the collector lead 244 of transistor 200 at which point the collector voltage will drop, the resulting feedback action causing the circuit to switch suddenly to the nonconducting state.

As the scale oscillates the power transformer transistor 200 collector voltage output occurs in pulses of fixed amplitude but variable width and high repetition rate. These pulses are smoothed in a 3-section RC filter 246 to a steady D.C. voltage representing the average value of coil current, and therefore, weight. The averaging process is rapid, and is usually required in any case to take care of short-period variations in weight due to residual vibration of the scale.

The oscillator is a conventional free-running multivibrator designed to produce a nearly sinusoidal output. The high voltage is transformed down to minimize radiation from the cable to the scale.

The operation of the electrical operating and control devices for the scale will be briefly reviewed in connection with the skeleton diagrams, FIGS. 2 and 3 as follows:

The scale is assumed to be initially in balance with no weight on the pan and in a position such that plate 122 is mid-way between plates 120 and 126, so that the capacitance between 122 and 120 is equal to that between 122 and 126. As a consequence the A.C. voltage between 122 and 126 is half the voltage between 124 and 126. Since this voltage is the same as that of the transformer secondary center tap (ground), there is no signal between 122 and ground and therefore no output from the amplifier 250 in FIG. 2.

If a weight is placed on the pan the scale will be unbalanced and the pan will move downwards in response to gravitational attraction. As a result plate 124 will move closer to 122 and 126 will move away. The capacitances will then be no longer equal and an A.C. voltage will appear on 122 with respect to the transformer center tap (ground). This signal will be amplified in the amplifier 250 and compared with the reference phase in the phase comparator 184. The reference phase will have been chosen so that the phase of the signal corresponding to a downward deflection of the scale pan will result in a positive D.C. voltage output from the phase comparator. This positive D.C. voltage applied to the bistable amplifier will cause it to switch discontinuously to the "on" state when it reaches a certain value corresponding to a certain small deflection of the scale. The "on" state of the bi-stable amplifier results in a fixed voltage being suddenly applied to thes cale coil through a resistor. The coil will have been so connected that the resulting flow of current will produce an upwardly-acting force much larger than the downward unbalancing force of the unknown weight. The scale pan will then move rapidly upwards, past the position of zero output of the differential capacitor and to a position such that plate 126 is closer to 122 than is plate 124. A signal will again appear between 122 and ground, but this time of opposite phase. The phase comparator will produce a negative D.C. output from a signal of this phase, and when this output reaches a certain value it will cause the bi-stable amplifier to switch to the "off" condition, thereby reducing the coil current suddenly to zero. Gravitational forces will then take over and the cycle will repeat itself. A stable oscillatory condition will thus take place in which the scale pan oscillates about the fixed position of zero output from the differential capacitor.

The scale pan will oscillate between two fixed positions or "stops" as determined by the "on" and "off" signal requirements of the bi-stable amplifier 194. The weight will, of course, overshoot these fixed stops because time is required for the force, which has suddenly been applied when the stop is reached, to reverse the direction of motion. A dashpot 252 (see FIG. 3) is, therefore, provided to apply friction damping and dissipate the kinetic energy imparted to the mass and thus limit the overshoot.

When the weight reaches the upper stop and the current in the weight balancing coil 140 is switched off, the time taken for the weight to return to the lower stop is determined by the mass of material on the scale, since a certain amount of work must be done against dashpot friction and the rate at which this work is done is determined by the downward force exerted by the mass.

The force available to produce upward motion is the upward coil force less the force due to the weight. Thus, a heavy weight will cause rapid downward motion but will leave only a small net force to produce upward motion which will be slow. As a result, coil current will be applied during a large portion of the total cycle. On the other hand, a small weight requires a larger time to travel down and permits nearly the full coil force to produce rapid upward motion. If the coil current is averaged over several cycles, then the average current will be seen to be proportioned to the weight. So long as there is no drift in the positions of the stops during a measuring period, the average current (force) must equal the weight.

The invention having been described what is claimed is:

1. In an electromagnetic balance having a stationary frame, a member pivotally supported on said frame, a force receiving surface operatively connected to said member, means positioning said member at a neutral position, and a solenoid connected between said pivoted member and stationary frame acting when energized to move said member against said force, the combination of electrical operating and control devices for said balance comprising a differential capacitor including a movable plate connected with said member operative upon movement of said member from the neutral position to produce an unbalance signal, an oscillator connected with said differential capacitor, means to amplify said unbalance signal, a phase comparator to which said signal is fed including a rectifier and filter to produce a D.C. output of polarity dependent on phase, a bistable D.C. amplifier including means responsive to a signal of one polarity only to produce a current of substantially constant voltage for the duration of said signal, and means for applying said constant voltage output for energizing said solenoid, whereby energizing impulses of substantially constant voltage are imparted to said solenoid of varying period and duration in accordance with the period and duration of said unbalance signals.

2. An electromagnetic balance according to claim 1 in which there is provided means for obtaining a signal representing the time average of the repetitive voltage impulses produced by said impulses for a predetermined time period.

3. In an electromagnetic balance having a stationary frame, a member pivotally supported on said frame, a force receiving surface operatively connected to said member, means positioning said member at a neutral position, and a solenoid connected between said pivoted member and stationary frame acting when energized to move said member against said force, the combination of electrical operating and control devices for said balance comprising a differential capacitor including a movable plate connected with said member operative upon movement of said member from the neutral position to produce an unbalance signal, an oscillator connected with said differential capacitor, means to amplify said unbalance signal, a phase comparator to which said signal is fed including a rectifier and filter to produce a D.C. output, a bistable D.C. amplifier including a transistor having a base-to-emitter connection with said phase comparator, a shunt diode circuit of opposite polarity by-passing said base to emitter connection, and a power transformer transistor connected to supply an energizing current to said solenoid in accordance with said unbalance signal.

4. In an electromagnetic balance having a stationary frame, a member pivotally supported on said frame, a force receiving surface operatively connected to said member, means positioning said member at a neutral position, and a solenoid connected between said pivoted member and stationary frame acting when energized to move said member against said force, the combination of electrical operating and control devices for said balance comprising a differential capacitor including a movable plate connected with said member operative upon movement of said member from the neutral position to produce an unbalance signal, a high voltage oscillator connected with said differential capacitor, means to amplify said unbalance signal, a phase comparator to which said signal is fed including a rectifier and filter to produce a D.C. output, and a bistable D.C. amplifier comprising at least one amplifier transistor unit having a base-to-emitter circuit of one polarity only from said phase comparator, a shunt diode circuit of opposite polarity bypassing said amplifier transistor, and a collector connection, a power transformer transistor having an emitter-to-base connection, with the collector connection of said transistor amplifier unit, and a collector connection with said solenoid, means for supplying a cut-off voltage to said transistors, and means connected with said power transformer transistor to produce a constant voltage output of said power transformer transistor, and means connecting said power transformer transistor with said solenoid for energizing said solenoid, whereby energizing impulses of substantially constant voltage are imparted to said solenoid of varying frequency and duration in accordance with the frequency and duration of said unbalance signals.

5. An electromagnetic balance according to claim 4 in which the bistable D.C. amplifier includes a plurality of amplifier transistor stages coupled in cascade.

6. In an electromagnetic balance having a stationary frame, and member pivotally supported on said frame, a force receiving surface operatively connected to said member, said member being movable in opposite directions with relation to an average position, a force producing magnetic coil comprising relatively movable coil and armature elements, one of said coil and armature elements being mounted from said frame, and the other of said coil and armature elements being supported from said member for movement therewith, the combination of electrical operating and control devices for said balance comprising an electric detector device sensitive to any displacement of the pivoted member in one direction from said average position under the influence of an added increment of force to produce an unbalance signal, an electric current carrying circuit responsive to any unbalance signal, a constant voltage supply source connected when rendered operative to energize said magnet to urge the pivoted member in the opposite direction, and an electric switching circuit actuated by any said unbalance signal to cause said constant voltage supply source to energize said magnet and upon cessation of said signal to de-energize said magnet, whereby energizing impulses of substantially constant voltage are imparted to said magnet of varying period and duration in accordance with the period and duration of said unbalance signals to move said member in said opposite direction toward said average positions.

References Cited in the file of this patent
UNITED STATES PATENTS

| 2,734,736 | Payne | Feb. 14, 1956 |
| 3,000,101 | Giardino | Sept. 19, 1961 |

FOREIGN PATENTS

| 970,648 | Germany | Oct. 16, 1958 |